United States Patent [19]

Douden et al.

[11] Patent Number: 4,971,697

[45] Date of Patent: Nov. 20, 1990

[54] THIN SILICA FLAKES AND METHOD OF MAKING

[75] Inventors: David K. Douden, Richfield; Thomas J. Scanlan, Woodbury, both of Minn.

[73] Assignee: Minnesota Mining and Manufacturing Company, St. Paul, Minn.

[21] Appl. No.: 314,752

[22] Filed: Feb. 23, 1989

[51] Int. Cl.$^5$ .................... B01D 15/08; B01D 39/06; B01D 39/16; B01D 39/20

[52] U.S. Cl. ................... 210/502.1; 210/635; 210/657; 428/305.5; 428/311.5; 428/317.9; 435/803

[58] Field of Search ............... 210/502.1, 657; 428/305.5, 311.5, 317.9

[56] References Cited

U.S. PATENT DOCUMENTS

| | | | |
|---|---|---|---|
| 3,794,503 | 2/1974 | Netting | 106/288 B |
| 3,795,524 | 3/1974 | Sowman | 106/65 |
| 3,796,777 | 3/1974 | Netting | 264/13 |
| 3,960,583 | 6/1976 | Netting et al. | 106/122 |
| 4,153,661 | 5/1979 | Ree et al. | 264/120 |
| 4,349,456 | 9/1982 | Sowman | 252/317 |
| 4,373,519 | 2/1983 | Errede et al. | 128/156 |
| 4,460,642 | 7/1984 | Errede et al. | 428/283 |
| 4,565,663 | 1/1986 | Errede et al. | 264/120 |
| 4,810,381 | 3/1989 | Hagen et al. | 428/317.9 |

FOREIGN PATENT DOCUMENTS 0240952 3/1987 European Pat. Off. .

*Primary Examiner*—James C. Cannon
*Attorney, Agent, or Firm*—Donald M. Sell; Walter N. Kirn; Lorraine R. Sherman

[57] ABSTRACT

Hydrated sodium silicate particles can be expanded by heat to form thin-walled bubbles that can be broken, neutralized, washed and dried to provide hydrated silica flakes. These flakes can be mixed with non-swelling sorptive particles such as TLC grade silica and used to make chromatographic articles. One such article is a composite of a poly(tetrafluoroethylene) fibril matrix in which those particles and hydrated or fired silica flakes are enmeshed. The hydrated silica flakes can be fired to a refractory state and then incorporated into protective coatings to enhance their resistance to abrasion while also better protecting the coated substrates from corrosion.

10 Claims, 1 Drawing Sheet

THIN SILICA FLAKES AND METHOD OF MAKING

BACKGROUND OF THE INVENTION

1. Field of the Invention

This invention relates to a method of economically manufacturing thin silica flakes and novel silica flakes produced by that method. In another aspect, the invention also relates to chromatographic articles made with the silica flakes as well the use of the silica flakes in protective coatings.

2. Background of the Invention

U.S Pat. No. 3,795,524 (Sowman) discloses a method of making refractory articles (especially fibers, but also films, flakes, and microspheres) from either an aqueous solution of water-soluble aluminum and boron compounds or a colloidal dispersion of silica and water-soluble or dispersible aluminum compounds and boron compounds. Such a solution or dispersion is often called an "organosol" or a "sol-gel". To make flakes, the organosol is coated onto a non-adhering smooth inert substrate and dried to form a film which may tend to crack and form flakes. After being removed from the substrate, the "film can be comminuted to form irregularly shaped particles, flakes, or aggegates, e.g., 1/16" to 1" large, 1 to 25 microns thick, or ground to powders of small size" (col. 11, ls. 39-42) that were converted to refractory flakes by being fired at temperatures up to 1000° C. "In the form of particulate materials, the refractory products can be used as fillers and/or coloring agents or pigments for paints and enamels...." (col. 13, ls. 8-11). They can also be used as abrasion-resistant agents for elastomeric materials (col. 13, ls. 34-40). Refractory flakes are formed in Examples 20-23 of the Sowman patent.

U.S. Pat. No. 4,349,456 (Sowman) discloses a method of making refractory ceramic metal oxide microcapsules from an organosol similar to those of the earlier Sowman '524 patent. The microcapsules after being fired have diameters within the range of about 1 to 1000 $\mu$m and a uniform wall thickness in the range generally of 0.1 to 100 $\mu$m (col. 8, ls. 16-20). The microcapsules are crushable to flakes, as shown in FIG. 2 of Sowman '456, but we fail to find in Sowman '456 any mention of utility for these refractory flakes.

European Pat. Publ. 240952 (Saegusa), published Oct. 14, 1987, discloses a process similar to that of Sowman '524 in that a thin coating of a solution or sol of a metallic compound is applied to a smooth surface, dried, and scraped off as flakes. The flakes can either be used as such or fired at a temperature of from about 200° C. to about 1100° C., preferably from 500° C. to 900° C. The resulting refractory flakes are said to be from about 0.01 to about 10 $\mu$m in thickness and used in lengths of from about 1 to 100 $\mu$m. Uses for the flakes are said to include lustrous pigments in nail enamels, enamels, leather products, exterior automotive coatings, paints, and pearl-glazed buttons. Metallic compounds used in the examples include oxides of Zr, Ti, Al, Si, Sn.

It is believed that thin refractory flakes produced by any of the above-discussed methods would be too expensive to be put to any widespread use.

U.S. Pat. Nos. 3,794,503, 3,796,777 and 3,960,583 disclose hollow spheres made from alkali metal silicate. In all cases a coreactant such as aqueous ammonium pentaborate, sodium hexametaphosphate, or sodium pentaborate is required in the preparation. In addition, expansion of the silicate particles is required to take place in a spray dryer.

Known in the art are chromatographic processes for separating and analyzing mixtures of solutions by selective adsorption on materials such as nylon, alumina, and silica. The processes are based on differences in the distribution ratios of the components of mixtures between a mutually immiscible mobile and a fixed stationary phase. In particular, there are formed isolated spots or bands which can be separated mechanically and further examined. In thin layer chromatography, it is known to use thin films, such as silica mixed with a binder (e.g., calcium sulfate) adhered to glass for the separating vehicle.

Chromatographic articles are disclosed in patent application U.S.S.N. 01/137,811, filed Dec. 25, 1987 and now U.S. Pat. No. 4,810,381, and are composites of a poly(tetrafluoroethylene) [PTFE] fibril matrix and non-swellable sorptive particles enmeshed in said matrix, the ratio of said particles to PTFE being in the range of 19:1 to 4:1. The non-swellable sorptive particles can be silica particles that have been treated to be surface-active, are marketed as "TLC grade silica" (Aldrich Chemical Co., Milwaukee, WI) and are sometimes called "silica-gel particles", and have an apparent size within the range of 1 to 100 $\mu$m. The chromatographic articles are marketed as conformable strips or disks that have a chamois-like feel.

Other composite articles comprising PTFE fibril matrices and particulate enmeshed therein are disclosed in U.S. Pat. Nos. 4,565,663 and 4,460,642 (which are a division of a continuation-in-part and a continuation-in-part, respectively, of U.S. Pat. No. 4,373,519), and in U.S. Pat. No. 4,153,661.

Summary of the Invention

The present invention provides a method of making thin silica flakes that can be made more economically than by any of the above-discussed methods for making refractory flakes. The thin silica flakes can be used either with or without being fired. The unfired hydrated silica flakes are believed to be novel and can be used to make chromatographic articles that can provide both (1) faster separation and (2) improved resolution as compared to prior chromatographic articles. After being fired, the silica flakes, when incorporated into protective coatings, can enhance resistance to abrasion and also better protect coated substrates from corrosion. Furthermore, the fired silica flakes improve the resistance of such coatings to weathering.

Briefly, the present invention provides a chromatographic article comprising a poly(tetrafluoroethylene) fibril matrix having enmeshed therein a mixture of non-swellable sorptive particles and hydrated silica flakes as defined below. In a preferred embodiment, the non-swellable sorptive particles can be silica particles such as are disclosed in application U.S. Serial No. 07/137,811, which application is incorporated herein by reference. U.S.S.N. 07/137,811 does not teach or suggest a composite chromatographic article of superior properties that comprises hydrated silica flakes in addition to a PTFE fibril matrix and non-swellable sorptive particulate. As used in the present invention, non-swellable sorptive particles or particulate does not include hydrated silica flakes.

In another aspect, the present invention provides novel hydrated silica flakes prepared according to the method described below. The flakes are of substantially uniform thickness, the average thickness being no more than 3.0 micrometers, perferably in the range of 0.5 to 1.5 micrometers In yet another aspect, the present invention provides a novel method for making thin silica flakes and includes the sequential steps of
  (a) heating hydrated alkali silicate particles to expand them into bubbles of an average diameter at least twice their original average diameter while reducing their average wall thickness to less than 3 mm,
  (b) breaking the bubbles into fragments, and
  (c) neutralizing, washing, and drying the fragments to yield hydrated silica flakes.

For use in protective coatings, step c) preferably is followed by a step of
  (d) firing the hydrated silica flakes to provide refractory silica flakes.

As used in this application:
  "matrix" means an open-structured entangled mass of microfibers;
  "non-swellable particulate" or "non-swellable particles" or "non-swellable flakes" means particulate or flakes having a change in volume, wherein change in volume=

$$\frac{V_g - V_o}{V_o},$$

of less than 0.5, preferably less than 0.1, most preferably less than 0.01, where $V_g$ is the volume of the particulate or flake when swollen and $V_o$ is the volume of the dry particulate or flake;
  "sorbent" or "sorptive" means capable of taking up and holding by either absorption or adsorption;
  "substantially" means that at least 90 percent of the articles have the specified property;
  "transparent" means that the material, when viewed under an optical microscope (e.g., with a stereoscopic microscope at 50X and under oblique or transmitted light), has the property of transmitting rays of visible light so that images of article viewed through the material have sharp edges;
  "ceramic" means nonmetallic, inorganic materials;
  "hydrated silica flakes" means flakes having a gel structure and comprising up to 60 weight percent water, preferably 1 to 50 weight percent water, more preferably 2 to 50 weight percent water, even more preferably 5–50 weight percent water, and most preferably 15 to 50 weight percent water;
  "bloom" means relatively high concentration of a particular component at the surface of a material; and
  "vitreous" means derived from an inorganic material, at least a portion of which has been melted.

DETAILED DESCRIPTION

Figure 1:
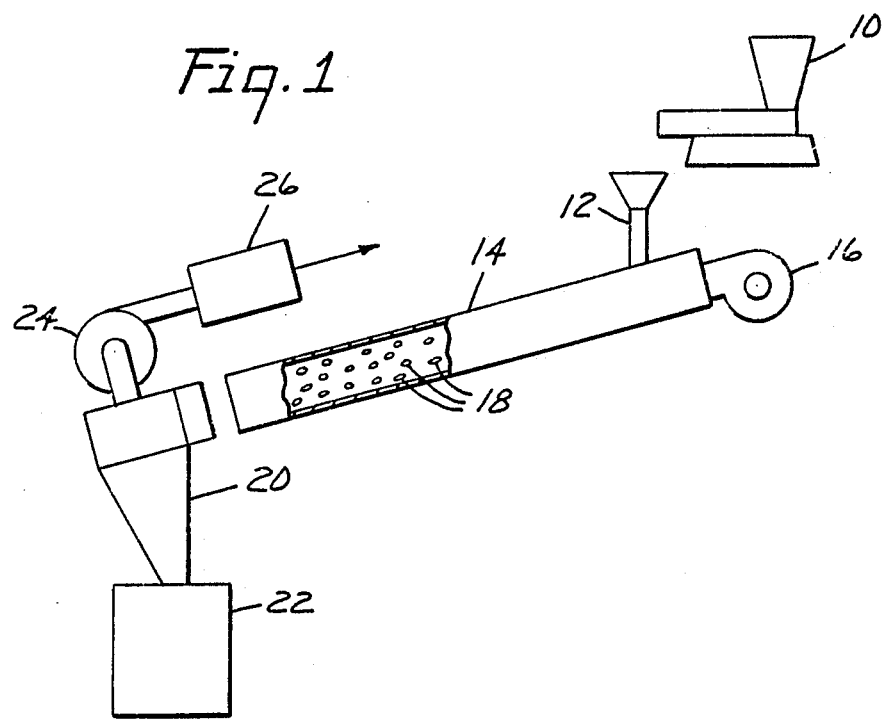

Hydrated alkali silicate particles, commercially available such as from PQ Corporation (Phila., PA), which are useful in the preparation of the hydrated silica flakes of the present invention have an average diameter in the range of up to 300 μm, preferably up to 200 μm. Useful hydrated alkali silicate particles can have a silica to alkali molar ratio in the range of 1:1 to 4:1, preferably about 1.5:1 to 3.2:1. When fed into a moving stream of heated gas such as air, at a temperature in the range of 400 to 850° C., preferably 475–525° C., the hydrated alkali silicate particles expand into hollow bubbles at least 1.5 times their original diameter, preferably in the range of 2.0 to 10.0 times their original diameter, preferably 2.5 to 3.0 times their original diameter. After the resulting bubbles are broken into fragments, preferably by impact in a collection system, they are neutralized preferably by reaction with acid or acid salt, washed and dried. Preferably the hydrated silica flakes of the invention are free of stabilizers, such as borates and phosphates, which prevent leaching of the alkaline component (e.g., Na or K).

By adjusting the temperature of heating step a), the average diameter and the wall thickness of the bubbles can be controlled to some extent (generally, increased heat results in thinner walls), but generally, the thinnest average wall thickness that can be attained is about 0.5 μm. The broken fragments shrink in the range of 5 to 15 volume percent, preferably about 10%, during drying and another 5 to 15 volume percent, preferably about 10%, upon being fired. The thinnest refractory silica flakes that have been produced by the above-outlined method have an average thickness of about 0.4 μm.

The fragments produced in step b) preferably are substantially flat (i.e. they do not vary more than 20° from the planar surface), but a few have a distinctive curved shape. Their shapes are not noticeably changed in converting them to hydrated silica flakes in the course of step (c). Neither is there a noticeable change in shape when the hydrated silica flakes are fired in the alternative step (d) unless the flakes are overfired.

During the drying step temperatures can range from room temperature to 200° C., preferably 100–125° C.

When the firing step (d) is carried out at temperatures gradually rising from ambient to the final firing temperature, e.g., the final firing temperature being from 500 to 1200° C., preferably from 500° to 900° C., the drying of step (c) can be omitted.

Silica flakes produced by the above-outlined method, whether fired or unfired, are substantially transparent and colorless, an advantage for use in a chromatographic article. When used in a composite chromatographic article, best results have been attained with hydrated silica flakes of the invention that have not been fired, although composite chromatographic articles made with fired silica flakes of the invention provide the above-mentioned advantages over the prior art, although to a lesser extent. When used in protective coatings, the silica flakes are more durable and wear-resistant when fired. Silica flakes which have been impregnated with 2 to 15 weight percent sodium hydroxide and then fused (at a temperature in the range of 700–900° C.) are also useful in protective coatings. These vitreous silica flakes have an average thickness up to 1.5 micrometers.

A preferred range of thicknesses for most uses of both the hydrated silica flakes and the refractory silica flakes is from 0.5 to 1.5 μm. While thicker (i.e., 0.5 up to 3.0 μm) hydrated silica flakes would be equally useful in chromatographic articles, it would be wasteful of raw materials to make them to have an average thickness much greater than the aforementioned range.

For use in chromatographic articles, the hydrated or fired silica flakes preferably have an average breadth (largest dimension) of from 10 to 150 μm, more preferably 10 to 100 μm. It is believed that silica flakes of the preferred size are optimally effective in acting as wicking bridges, thus improving both the speed of separation and the resolution of the chromatographic articles.

When the silica flakes are to be used in protective coatings, the coating apparatus tends to orient them with their flat surfaces extending generally parallel to the coated surface. Hence, a coating can have several "layers" of silica flakes when their average thickness is within the aforementioned preferred range so that any corrosive material must take a serpentine path to reach the coated surface of the protected object. For use in protective coatings, the same range in average breadth is preferred, namely, from 10 to 100 $\mu$m. The resin incorporating the silica flakes can be any resin useful as a protective coating, e.g., acrylics, urethanes, alkyds, latexes, etc. Useful amounts of silica flakes are in the range of 2 to 20 weight percent, preferably 5 to 15 weight percent of the total coating composition.

Composite chromatographic articles in which the hydrated silica flakes of the present invention can be incorporated include those which employ a substrate bearing a thin layer of a binder comprising a mixture of the silica flakes and non-swellable sorptive particles of the above-cited application, U.S.S.N. 07/137,811. Useful substrates include glass, paper, metal, and organic polymers. Preferably, the mixture of particulate and silica flakes is enmeshed in a poly(tetrafluoroethylene) [PTFE] fibril matrix in accordance with the procedure disclosed in U.S.S.N. 07/137,811 to provide conformable chromatographic sheets that have a chamois-like feel. The fastest separation of components and/or color and improved resolution are attained when the silica flakes comprise from 10 to 40 percent by weight of said particulate and flakes mixture, and the ratio of said particulate and flakes mixture to PTFE being in the range of 19:1 to 4:1 by weight. The composite article of the present invention should have a net surface energy in the range of 20 to 300 milliNewtons per meter.

Non-swellable sorptive particulate (which can be one material or a combination of materials) useful in the present invention is non-swellable in aqueous and organic media and is substantially insoluble in water or an elution solvent. Not more than 1.0 gram of particulate will dissolve in 100 g of aqueous medium or elution solvent into which particulate is mixed at 20° C. The particulate material can be an organic compound, a polymer, or an inorganic oxide such as silica, alumina, titania, zirconia, or other ceramics, or it can be ion exchange or chelating particles. Preferred particulate material is silica and zirconia, with silica being particularly preferred because of the ease in bonding a variety of hydrophobic and semi-hydrophobic coatings onto its surface and because silica particulate is commercially available.

Suitable non-swellable sorptive particulate for the purposes of this invention include any particulate which can be coated with insoluble, non-swellable sorbent material or the surface (external and/or internal) of which can be derivatized to provide a coating of insoluble, non-swellable sorbent material. Preferred supports for such coatings include inorganic oxide particles, most preferably silica particles. The insoluble, non-swellable sorbent coatings generally have a thickness in the range of one molecular monolayer to about 300 micrometers. Such particles having coated surfaces are well known in the art, see, for example, Snyder and Kirkland, "Introduction to Modern Liquid Chromatography", 2d Ed., John Wiley & Sons, Inc. (1979) and H. Figge et al., "Journal of Chromatography" 351 (1986) 393-408. The coatings can be mechanically applied by in situ crosslinking of polymers or the coatings can be functional groups covalently bonded to the surface of the particles. Many such coated particles are commercially available (e.g., $C_{18}$ bonded phase silica, Alltech, Deerfield, IL).

Coatings which can be applied to silica particulate can be either thin mechanical coatings of insoluble, non-swellable polymers such as crosslinked silicones, polybutadienes, etc. or covalently bonded organic groups such as aliphatic groups of varying chain length (e.g., $C_2$, $C_8$, and $C_{18}$) and aliphatic and aromatic groups containing amine, nitrile, hydroxyl, chiral, and other functionalities which alter the polarity of the coating. The silica, or other support particle, in this case acts primarily as a carrier for the organic coatings and the particles are non-swellable. The variation in the chemical composition of the coatings provides selectivity in molecular separations and polarity.

The silica flakes of the invention can be coated similarly (after either step (c) or step (d) of the method) as described for the silica particulate to provide modification of surface properties.

The non-swellable sorptive particulate may have a spherical shape, a regular shape or an irregular shape. This particulate material which has been found useful in the invention has an apparent size within the range of 0.1 to about 600 micrometers, preferably in the range of 1 to 100 micrometers. It has been found advantageous in some instances to employ particulate materials in two or more particle size ranges falling within the broad range.

Non-swellable, sorptive particulate useful in the present invention have water sorptive capacity less than 10% by weight, preferably less than 1% by weight. The hydrated and refractory silica flakes of the invention likewise are non-swellable.

In the present invention, non-swellable, sorptive particulate can be pre-mixed with a property modifier or processing aid. Representative property modifiers or processing aids (some of which can be soluble in water) can be coated particles (e.g. cation exchange resins), calcium carbonate, ammonium carbonate, kaolin, sugar, polyethylenes, polypropylenes, polyesters, polyamides, polyurethanes, polycarbonates, zeolites, chitin, vermiculite, clay, ceramics, ion exchange and chelating particles, and the like. These property modifiers or processing aids can be present in an amount in the range of 0 to 28.99 parts per part of PTFE, preferably 0 to 9.00 parts per part of PTFE, provided that the sorbent non-swellable particles plus property modifiers or processing aids do not exceed 29 parts particulate to 1 part PTFE.

Other non water-swellable property modifiers may be advantageously added to the mixture of the PTFE aqueous dispersion and the primary particulate material to provide futher improvement in or modification of the composite articles of the invention. For example, modifier particulate can include chromatographically inactive materials such as low surface area glass beads to act as property modifiers and processing aids. It is desirable from a surface energy standpoint to minimize the PTFE level and at times to alter the level of the active particulate. Coloring or fluorescing particulate can be added at low levels (up to 10 weight percent of particulate) to aid in visualizing sample components to be separated. Chemically active particulate which indicate pH or acidity of the component bands can be useful for diagnostic purposes.

A limited amount of water-swellable property modifiers (i.e., up to 30 weight percent, preferably less than 25 weight percent, more preferably less than 10 weight percent, and most preferably less than 1 weight percent, of total particulate) can be useful as a processing aid. Representative swellable property modifiers include starch, chitosan, modified starches such a Sephadex ™ and Sepharose ™ (Pharmacia, Sweden), agarose, polymethacrylates, styrene-divinylbenzene copolymers, polyacrylamides, cellulosics, and coated particles (e.g., silica coated with a polyacrylamide). Water-swellable materials may be used as a thin coating on non-swellable particulate.

The composite chromatographic article is prepared in accordance with the description in U.S.S.N. 07/137,811, which is incorporated herein by reference, except that the hydrated silica flakes of the invention are pre-mixed with the sorptive particles, as is disclosed in detail in Example 6 below.

The composite chromatographic structure preferably is a uniformly microporous, composite sheet comprised of non water-swellable sorptive particles and hydrated silica flakes distributed approximately uniformly throughout a matrix formed of interentangled, fibrillated PTFE fibrils. In such a structure almost all of the particles and silica flakes are separate one from another and each is isolated in a cage that restrains the particle on all sides by a fibrillated mesh of PTFE microfibers. The preferred novel sheet of the invention has a thickness in the range of 125 to 10,000 micrometers and has a tensile strength of at least 0.5 MPa and even as high as 13.6 MPa. The article is substantially uniformly microporous, making it suitable for use as a chromatographic composite article which can be used as a single self-supporting sheet or a combination of sheets to form a stack or as a composite film adhered to a support such as glass, paper, metals, or polymers.

Silica flakes produced by the above-outlined method, whether fired or unfired, are substantially transparent and colorless, an advantage for use in a chromatographic article. When used in protective coatings, the silica flakes are more durable and wear-resistant when fired. Improved resistance to corrosion which they impart to the coatings is believed to result in part from the presence of multiple layers of silica flakes so that any corrosive material must take a serpentine path to reach the coated surface of the protected object.

The silica flakes can be sized by screening, but the advantages may be outweighed by the cost of doing so, because the flakes before being sized usually can be easily broken to sizes that are satisfactory for desired uses.

THE DRAWING

Figure 2:
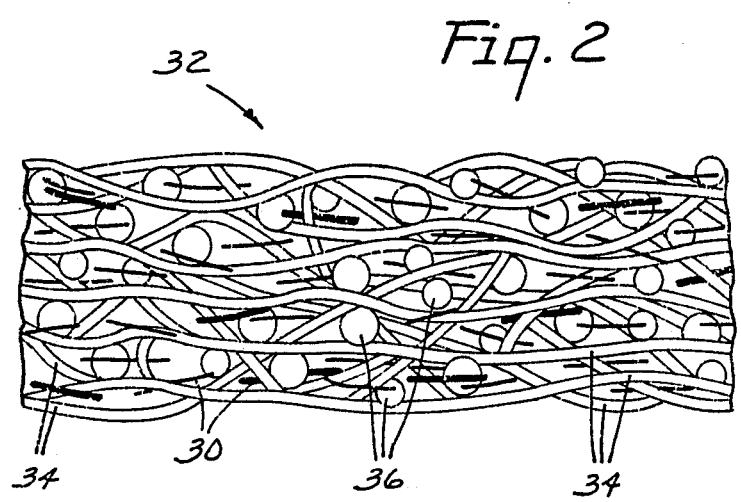

The invention may be more easily understood in reference to the drawing, both figures of which are schematic. In the drawing:

FIG. 1 shows an apparatus useful in producing thin hydrated silica flakes of the invention; and FIG. 2 is an edge view, greatly enlarged, through a composite chromatographic article that has been made with hydrated silica flakes produced by the apparatus of FIG. 1.

In FIG. 1, hydrated alkali silicate particles are fed from a solids feeder 10 via a funnel 12 into a duct 14 through which heated air is flowing from a blower 16. The heated air (400 to 850° C., preferably 475 to 525° C.) expands the particles to form bubbles 18 of an average diameter at least twice their original average diameter. The duct 14 carries the bubbles to a cyclone collector 20 that is fitted with a collection bin 22, an exhaust blower 24 and a dust filter 26. Upon striking the walls of the cyclone collector and collection bin, most of the bubbles are broken into fragments, but it may be desirable to crush them further (any crushing means can be useful, such as vibration in contact with ceramic beads, preferably of 2-4mm diameter), either before or after step c) of the above-outlined method.

FIG. 2 shows resulting hydrated silica flakes 30 which can be used in the manufacture of the composite chromatographic article 32. Hydrated silica flakes 30 are enmeshed in a matrix of PTFE fibrils 34 together with non-swellable sorptive particles 36 which are shown as spheres even though they may have irregular, chunky shapes.

Refractory or vitreous silica flakes of the invention, as mentioned above, can be useful in protective coatings.

The composite chromatographic articles of the invention can be of any desired size and shape. Preferably the articles can be sheet-like materials which, for example, can be in disk or strip form. Coating the non-swellable particulate (including silica flakes) with very thin (monolayer) materials or thicker materials provided by in-situ crosslinking of polymers or covalently bonding functional molecules on the surface of the particulate allows for the optimization of both the chromatographic selectivity and separation efficiency.

It is also within the scope of the invention to coat a support or carrier, such as glass, paper, or inert polymer, with a layer comprising a binder and a mixture of non-swellable sorptive particulate and thin-silica flakes. Useful binders include calcium sulfate.

The composite articles have utility in a wide variety of separations wherein the choice of the particulate material is useful for size controlled filtration or steric exclusion, for simple one step or multistep adsorption-desorption separations of specific components, for immobilization of reactive particulate to perform chemical or biochemical reactions, for ion-exchange conversion and isolation of cations and anions, for purification of materials, and for chromatographic separations and analyses in both passive and forced flow modes, for hydrophobic reverse phase and direct phase chromatography.

In the examples, all parts are given by weight.

Objects and advantages of this invention are further illustrated by the following examples, but the particular materials and amounts thereof recited in these examples, as well as other conditions and details, should not be construed to unduly limit this invention.

EXAMPLE 1

(Preparation of Hydrated Silica Flakes)

Hydrated sodium silicate particles ("GD" brand from PQ Corp.) $SiO_2:Na_2O=2.0:1.0$ (molar ratio), were fed into a moving stream of air heated to 480-500° C. at the rate of about 11 g/min. The particles expanded into hollow bubbles about 2.5 times their original diameter. The bubbles were collected at a cyclone collector as a mixture of spheroids and broken fragments. To 298 g of the expanded particles was added 240 g of glacial acetic acid in 8000 g of water, and intense stirring was continued for 30 minutes. After adding another 8000 g of water, the mixture was allowed to stand while solids settled. Liquid was decanted, and solids were dewatered on a suction filter and rinsed with about 1000 g of water.

The solids were resuspended in 16 kg water, stirred for 10 minutes, and allowed to settle. Supernatant liquid was decanted, and solids were dewatered on a suction filter, then rinsed with about 1 kg of water. This washing-leaching procedure was repeated two more times.

The resultant moist solids cake was resuspended in 12 kg of water and poured through a vibrating screen of nominal 90 μm openings on which about 15 g of 3mm glass beads had been placed. The vibrating action upon the solids while passing through the screen resulted in breaking the solids into silica flakes. After the flakes had settled, supernatant liquid was decanted, and the flakes were dewatered on a suction filter, leaving a moist cake of approximately 10% solids, the flakes of which were substantially flat, of irregular shape about 10–90 μm in breadth, and each flake was of substantially uniform thickness with the range of 0.5–1.25 μm. Upon being dried at 105° C., the hydrated silica flakes were a loose, fluffy mass.

EXAMPLES 2–5

Hydrated silica flakes were prepared following the procedure of Example 1 with the materials specified and properties as shown in TABLE I below.

TABLE I

| Example | 2 | 3 | 4 | 5 |
|---|---|---|---|---|
| Material Identification | sodium silicate Grade 34 solution | sodium silicate G TM Brand | sodium silicate sodium metasilicate (hydrate, analytical grade) | potassium silicate Kasil TM 6-soln |
| Source | Diamond Shamrock Corporation (Painesville, OH) | PQ Corp. | Baker (Phillipsburg, NJ) | PQ Corp. |
| $SiO_2$:alkali ratio/mol | 3.84:1.0 | 3.2:1.0 | 1.0:1 | 3.3:1 |
| Feed preparation | | | | |
| Dry | X | — | X | X |
| Mill | X | — | X | X |
| Screen 150–63μ | X | — | X | X |
| Moisture in feed | 27% | 19% | about 30% | 18% |
| Acidification agent | $HNO_3$ | $NH_4Cl$ | $HNO_3$ | $HNO_3$ |
| Product characteristics | | | | |
| Flake thickness | 1–3μ | 0.8–1.5μ | 0.3–1.2μ | 0.5–1.25μ |
| 100X appearance | clear-some arc | clear flat | clear & whitish lumps | clear flat |

X means procedure was done

EXAMPLE 6

Preparation of Chromatographic Article

The following were hand stirred with a metal spatula until a doughy mass was obtained:

| | Parts |
|---|---|
| hydrated silica flakes of Example 1 | 4 |
| sorptive silica particles about 8 μm in size (Analytichem TM TLC grade) | 16 |
| PTFE resin emulsion (Teflon TM 30B from E. I. duPont, Wilmington, DE) | 3.3 |
| deionized water | 45 |

The doughy mass was fed through a mill at a 0.3 mm gap to form a strip that was folded lengthwise in thirds and turned 90° between each of 10 initial passes. The resulting strip was fed through the mill at a successively reduced gap of 0.25, 0.19, 0.13, and 0.075 mm. Then the strip was folded lengthwise in eighths, turned, and passed through the mill at a gap of 0.3 mm, and then again reduced to a thickness of 0.075 mm at the same reduced gaps (0.25, 0.19, 0.13, and 0.075mm) followed by a gap of 0.064mm and finally a gap of 0.05 mm. The resulting wet strip was placed on a cloth and allowed to air dry for several hours, followed by several more hours in a vacuum oven at 50° C. The resulting ribbon was a chromatographic article that was cut into strips for testing.

EXAMPLES 7 and 8

Additional Chromatographic Articles

Additional chromatographic articles were made as in Example 6 except that the total 20 parts of particulate were as indicated in Table II and the hydrated silica flakes of Example 8 had been screened to pass 90 μm openings and to be retained on 63 μm openings.

TABLE II

| Example | Hydrated silica Flakes (%) | Sorptive silica particles (%) |
|---|---|---|
| 6 | 20 | 80 |
| 7 | 25 | 75 |
| 8 | 28 | 72 |
| A (comparative) | 0 | 100 |

Comparative Testing of Chromatographic Strip of

Example 7

A strip of Example 7 was injected at one end with dye (Analtech TM, Newark, DE, mix #4, cat. no. 30–40). Then that end of the strip was dipped into a solvent mix of dichloromethane and methanol (200:1 ratio). After 15 minutes, the strip was removed and had a series of colored spots as indicated in Table III that also reports the distance from the center of each dot to the point at which the dye had been injected. Table III also reports the same test on a strip of Comparative Example A except that it was removed after 20 minutes.

TABLE III

| | Example 7 (cm) | Comp. Example A (cm) |
|---|---|---|
| solvent height | 8.0 | 5.6 |
| purple spot | 6.7 | 5.0 |
| yellow spot | 5.0 | 3.7 |
| peach spot | 3.8 | 2.5 |
| 1st blue spot | 2.9 | 1.9 |
| 2nd blue spot | 2.2 | 1.5 |

Table III shows that the chromatographic article of Example 7, as compared to that of Comparative Example A (which is the same as the commercial Empore ™ chromatographic article identified hereinabove), provided both (1) faster separation and (2) improved resolution.

Comparative Testing of Chromatographic Strip of Example 8

A chromatographic strip of Example 8 was tested in comparison to one of Comparative Example A except that both strips were removed after 10 minutes. Results are reported in Table IV.

TABLE IV

|  | Example 8 (cm) | Comp. Example A (cm) |
| --- | --- | --- |
| solvent height | 7.1 | 4.1 |
| purple spot | 6.5 | 3.7 |
| yellow spot | 5.4 | 3.0 |
| peach spot | 4.6 | 2.2 |
| 1st blue spot | 4.0 | 1.8 |
| 2nd blue spot | 3.2 | 1.4 |

A large number of other chromatographic articles have been made in the same way as in Example 6 except at various proportions of the hydrated silica flakes and sorptive silica particles. When the hydrated silica flakes have provided either less than 10% (e.g., 5% and 7%) or have provided 40% or more of the total weight of those particulates, the speed and resolution have both been substantially slower than the chromatographic articles of Examples 7 and 8.

EXAMPLE 9

Each of four samples of the hydrated silica flakes of Example 1 was placed in a crucible and fired for 9 minutes at 550, 650, 750, and 850° C., respectively. X-ray diffraction analysis showed no crystalline structure.

Two additional samples of the same hydrated silica flakes were fired for 15 minutes at 1100 and 1200° C., respectively. X-ray diffraction analysis showed predominantly alpha-crystobalite.

The silica flakes that had been fired at 850° C. were screened to pass 70 μm openings and then dispersed into a protective coating composition, namely, a solution of 85 parts of acrylic resin (Acrylamac ™ 5136, Valspar/McWhorter, Minneapolis, MN) and 15 parts of a aminoplast resin (Resimene ™ 717, Monsanto, St. Louis, MO). After applying this dispersion to a glass slide and drying to a thickness of about 50 μm, the coating was adjudged to be equal in smoothness to a coating of the same composition except omitting the silica flakes. The dried coating containing the silica flakes was transparent, but had a frosty appearance.

EXAMPLES 10 and 11

Two grams of the hydrated silica flakes of Example 1 and 0.1 g of NaOH were wetted with water to form a fluid paste consistency, allowed to stand one hour, and dewatered in a suction filter without rinse, then dried at 93° C. for one hour. A portion of this was fired at 860° C./16 hours (Example 10) and another portion at 860° C./30 minutes (Example 11). When examined under a microscope at 100×, the silica flakes of Example 10 had developed somewhat rounded edges and had curled toward a spherical shape. The silica flakes of Example 11 showed only a slight degree of edge rounding and were substantially as flat as the starting hydrated silica flakes.

These examples show that by heating to a sufficiently high temperature a glassy (vitreous) flake was provided that can be useful in protective coatings.

EXAMPLE 12

A portion of the hydrated silica flakes of Example 1 was soaked in saturated cobalt sulfate solution at 93° C. for 18 hours, giving a pink color to the flakes. After being dewatered on a suction filter and lightly rinsed with water, the pink color mostly disappeared. The resulting cake, after being dried at 93° C. for two hours, showed a "bloom" of more intense pink color on its upper surface. A portion of the cake, after being fired at 850° C./30 minutes, showed a black patch where the "bloom" had been, and a very pale blue tint elsewhere. Examination under a microscope showed that the fired silica flakes had the same shape as the starting hydrated silica flakes.

This example shows that transparent, colored flakes were provided which can be useful in tinted protective coatings.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composite chromatographic article comprising a carrier bearing a mixture of non-swellable sorptive particles and silica flakes, said silica flakes being hydrated and of substantially uniform thickness, the average thickness being greater than 0 and no more than 3.0 um.

2. The composite chromatographic articles as defined in claim 1 wherein said sorptive particles comprise silica.

3. The composite chromatographic article as defined in claim 2 wherein said silica flakes comprise from 10 to 40% by weight of total particulate and flakes.

4. The composite chromatographic article as defined in claim 1 wherein said carrier is a poly(tetrafluoroethylene) fibril matrix in which said silica flakes and non-swellable sorptive particles are enmeshed.

5. The composite chromatographic article of claim 1 wherein the carrier is glass.

6. The composite chromatographic article of claim 1 wherein the carrier is selected from the group consisting of paper, metal and organic polymeric material.

7. The composite chromatographic article according to claim 1 wherein said carrier is coated on at least one surface with a layer comprising a binder and a mixture of non-swellable sorptive particulate and silica flakes.

8. The composite chromatographic article as defined in claim 1 wherein said hydrated silica flakes comprise from 10 to 40% by weight of said particulate and flakes mixture.

9. The composite chromatographic article as defined in claim 8 wherein the ratio of said particulate and flakes mixture to poly(tetrafluoroethylene) is in the range of 19:1 to 4:1 by weight.

10. The composite chromatographic article as defined in claim 9 wherein said composite article has a net surface energy in the range of 20 to 300 milliNewtons per meter.

* * * * *